Nov. 24, 1959 W. W. DEIGHTON ET AL 2,914,759
DATA STORAGE, READ-OUT AND TRANSFER APPARATUS
Filed March 4, 1955 5 Sheets-Sheet 1

*INVENTORS*
WILLIAM W. DEIGHTON
GEORGE M. DUGAN
ANDREAS G. MARKGRAF
DURAY E. STROMBACK

BY

AGENT

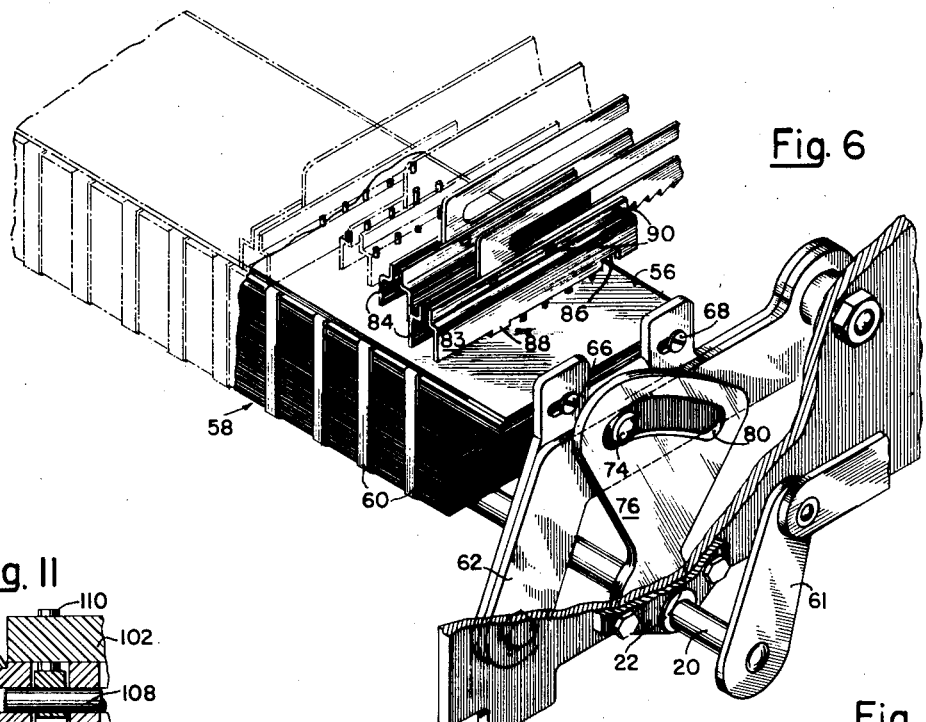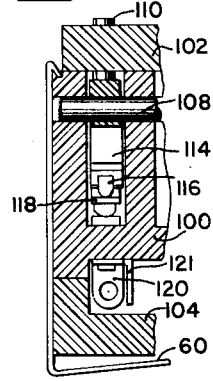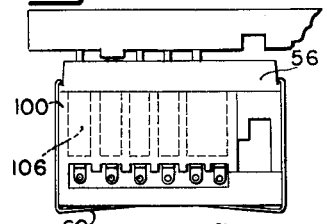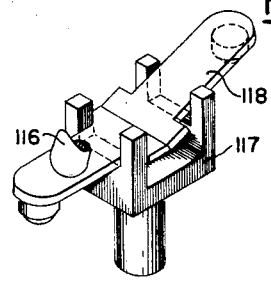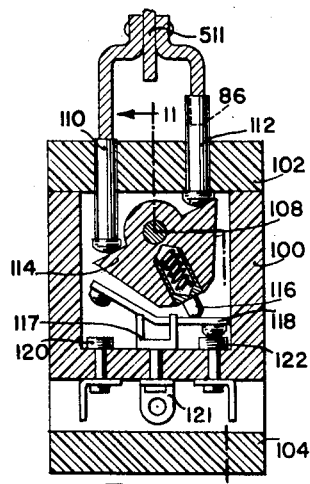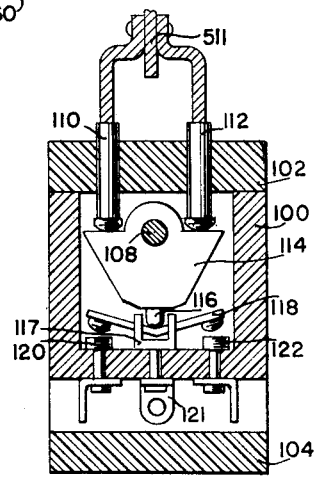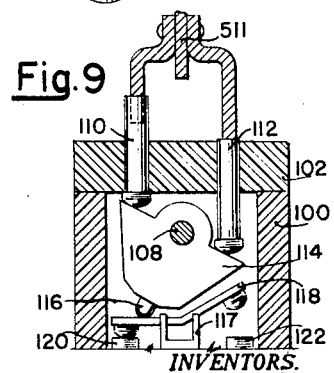

INVENTORS
WILLIAM W. DEIGHTON
GEORGE M. DUGAN
ANDREAS G. MARKGRAF
DURAY E. STROMBACK
BY
AGENT

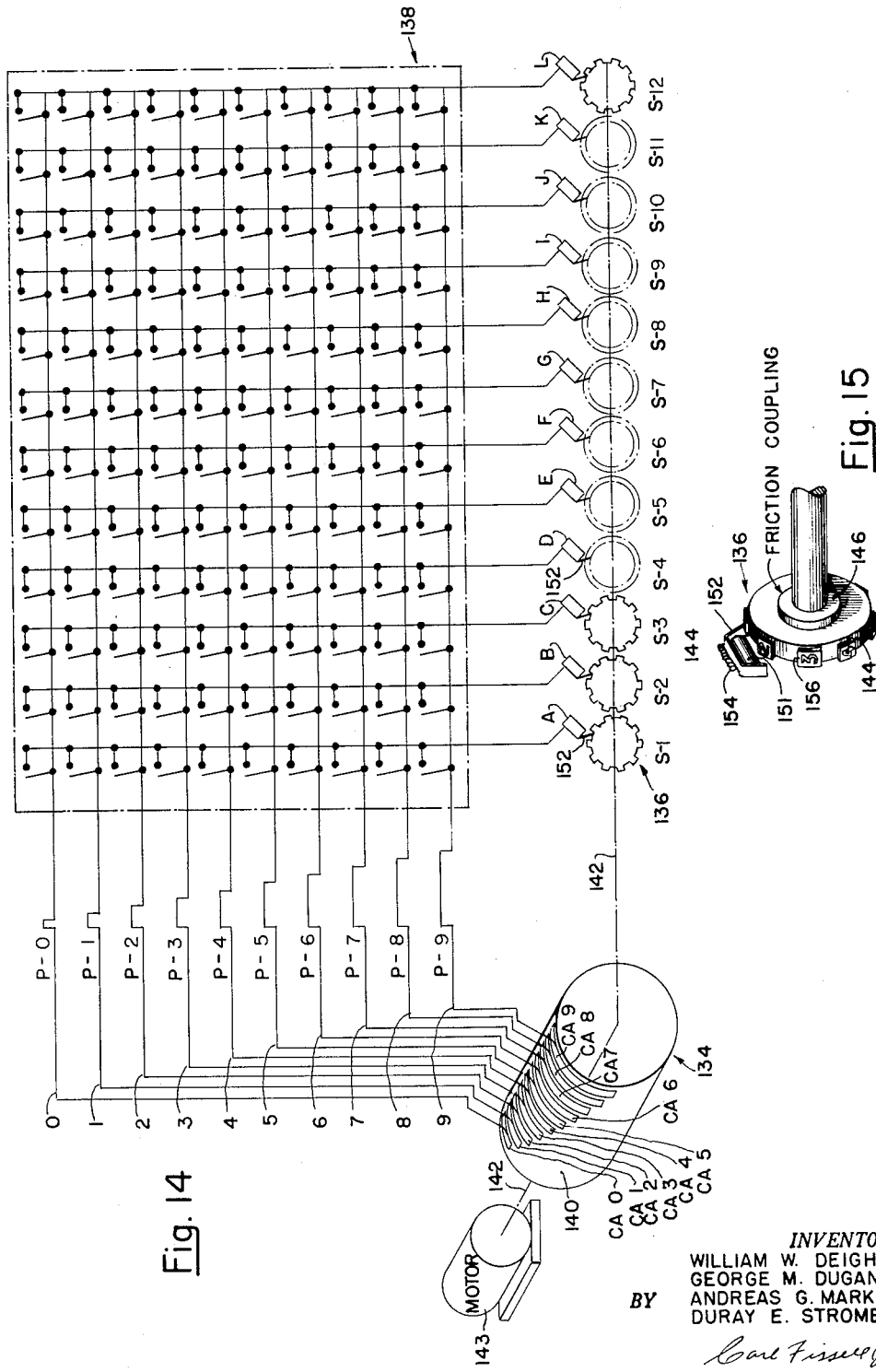

United States Patent Office 2,914,759
Patented Nov. 24, 1959

2,914,759

DATA STORAGE, READ-OUT, AND TRANSFER APPARATUS

William W. Deighton, Darby, George M. Du Gan, Ardmore, Andreas G. Markgraf, Philadelphia, and Du Ray E. Stromback, Paoli, Pa., assignors to Burroughs Corporation, Detroit, Mich., a corporation of Michigan Application March 4, 1955, Serial No. 492,232

25 Claims. (Cl. 340—365)

This invention relates to data storage apparatus and, more particularly, to apparatus wherein information is adapted to be indexed, stored, read out and transferred from one machine to another electromechanically.

In many calculating devices, business machines and the like, it is desirable to be able to index information into a machine, store and read or transfer this same information out of the machine at will. It is also desirable in most cases that the information be in a form which is readily available for use and which can be utilized with more than one machine without costly and complex translational apparatus being necessary. Further, it is desirable that the transfer of this information from one machine to another be made simply and instantaneously and that an exact electrical or mechanical correspondence exist between the machine elements supplying the original information and the machine elements of the unit into which the information is to be introduced.

This invention has the object of providing simple and relatively inexpensive means for reading out, storing and transferring positional information utilizing electrical switches. By causing the contacts of the switches to assume positions corresponding to the mechanical positions of the parts of the first machine and then placing an electrical potential on the selected contacts an electrical output can thus be generated. This electrical output may be used to indicate to some remotely located apparatus the exact position of the elements in the original apparatus and thus the remote unit is caused to be operated in exact correspondence with the machine supplying the original electrical or mechanical information.

It is therefore an important object of the present invention to provide automatic data read-out, storage and transfer apparatus.

It is another important object of the invention to provide improved means whereby the positions of mechanical elements in one machine are automatically coded into electrical impulses for introduction into and control of corresponding mechanical elements in a remotely located machine.

It is another important object of the invention to provide an improved electromechanical system for data storage, read out and translation of information.

It is a further important object of the invention to provide automatic data read-out means having the feature of indefinite or selective storage.

The foregoing objects and advantages as well as additional objects and advantages thereof will become more fully apparent by reading of the following detailed description of the invention, reference being had to the accompanying drawings in which:

Fig. 6 is a isometric view of a portion of the read-out mechanism and illustrating the apparatus in the sensing position thereof;

Figs. 7, 8 and 9 are sectional views in vertical cross section of a decimal switch of the type employed with the invention and showing three different switch positions;

Fig. 10 is an enlarged isometric view of the contactor portion of the switch mechanism of Figs. 7 through 9, inclusive;

Fig. 11 is a sectional view of the switch taken along line 11—11 of Fig. 7;

Fig. 12 is an end view of the switch unit incorporating a multiple stack of switches therein;

Fig. 14 is a diagrammatic view of a switching matrix and associated operating elements which may be employed with the present invention; and Fig. 15 is an enlarged fragmentary isometric view of one of the indicating devices employed in the system illustrated in Fig. 14.

Figure 1:
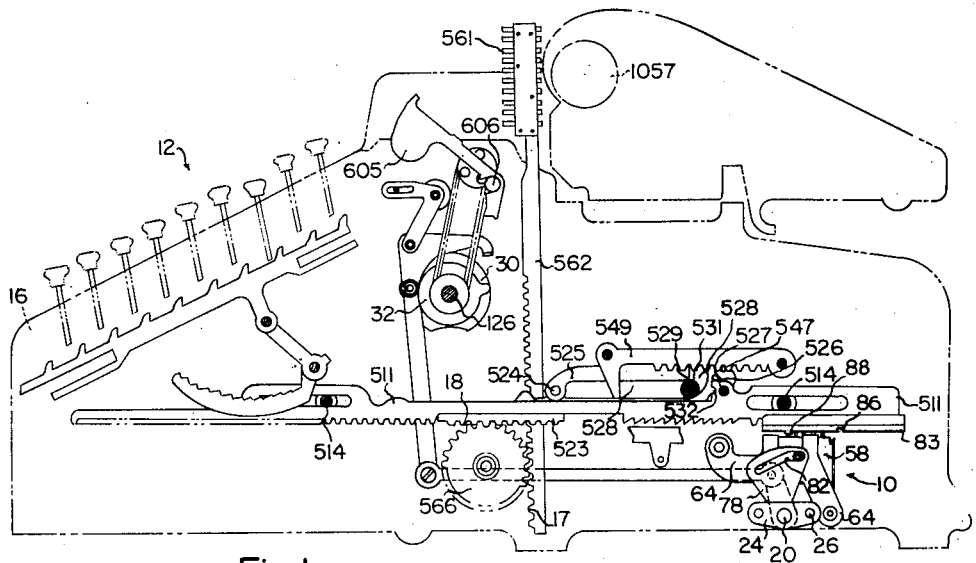
Fig. 1 is a fragmentary diagrammatic view of a printing apparatus constructed in accordance with the present invention.

In order to fully comprehend the significant features of the instant invention, it is desirable to describe, to at least a limited extent, the environment in which it is utilized. For a complete and detailed disclosure of this environment, resort may be had to Patent No. 2,629,549 issued to T. M. Butler, on February 24, 1953, for an Automatic Function Control Mechanism for Accounting Machines. In order to expedite cross-referencing, the reference numerals employed in the instant disclosure will, to the extent that it is practical, be identical to those designating similar elements in the above-identified patent to Butler.

In the illustrated embodiment of the invention, and referring more particularly to Fig. 1 therein, the numeral 12 generally designates a machine of the type described in the aforesaid patent a plurality of vertically extending print bars 562 and an equal number of actuator racks 511, all of which lie in planes parallel to that of the drawing. The actuator racks are forwardly and rearwardly slidably supported by two rods 514 which extend transversely across the machine and have their ends fixed to the side plates 14 and 16, Figs. 1 and 2.

As may be seen from the drawing, the print bars carry at their upper ends a plurality of type slugs 561 which are movable transversely of the bars. Forward of the bars, and pivoted about a shaft 606 are the hammers 605, each associated with an individual one of the print bars, which upon striking an aligned slug in its print bar will cause the latter to leave an impression upon a recording medium interposed between the slugs and platen 1057.

Hereinafter, the description will concern itself with only a single print set comprising a print bar, actuator rack, hammer and related elements; it being understood that the description is equally applicable to the additional print sets, each of which is substantially identical to the one described.

At its lower end, the bar 562 has a series of rack teeth 17 which engage gear 566 which is also in mesh with teeth 18 formed on the lower surface of a plate 523. The plate is mounted on a horizontally extending actuator rack 511 by means of a pair of elongated slots (not shown) on the plate, and mating studs (not shown) on the rack, in order to permit a limited amount of relative movement therebetween. The plate carries a stud 524 on which is pivotally mounted a coupling pawl 525 having in its rear end portion a cam slot 526 in which engages a stud 527 fixed to the actuator rack 511. Forwardly of cam slot 526, the coupling pawl has a slot 528 having a forwardly open horizontal portion connecting rearwardly with a vertical portion behind a shoulder 529 on the pawl 525. A tension spring (not shown) is normally so connected between the actuator rack 511 and its plate 523 as to hold the plate at the rearward limit of its possible relative movement with respect to the rack. In this position, the stud 527 of the actuator rack is in the upper forward portion of the cam slot 526 at the rear of pawl 525, compelling the pawl to assume a lowered position with respect to the actuator rack.

While the parts are in the above-described normal position with the machine at rest, a bail rod 531 extending transversely across the machine is engaged in the vertical portion of the slot 528 in the pawl 525, and between the rearwardly facing shoulder 529 of the pawl and a small concavity in the forward face of a shoulder 532 on the upper side of the actuator rack. The rack 511 is urged forwardly by a tension spring (not shown) which tends to hold shoulder 532 of the rack in engagement with bail rod 531.

When the bail rod is drawn forwardly by means not herein disclosed, but fully discussed in the above-identified patent to Butler, the actuator rack moves therewith because of the action of the above-mentioned tension spring until said rack is positively stopped. After the rack 511 has been stopped, the bail rod 531 acts against the shoulder 529 on pawl 525 and moves the latter, and thus also plate 523 which is rotatably connected to the pawl by stud 524, further forwardly relative to the arrested rack 511. It may be recalled that the plate is slidably mounted on the rack by means of elongated slots and studs. The tension spring which normally holds the plate in its extreme rearward position with respect to the rack yields during the above-mentioned relative movement.

During the forward movement of the plate relative to the arrested actuator rack 511, the stud 527 on the rack shifts into the rearward lower portion of the cam slot 526 in the pawl 525, thus raising the rearward end of the pawl and moving the shoulder 529 substantially above the center of the bail rod. By this raising of the rearward end of the pawl 525, a stud 547 on the extreme rearward end thereof is elevated into one of a series of notches in comb plate 549.

During the continued forward movement of the bail toward its forward limit, the bail acts on the edge of the shoulder 529 to cam the rear end of pawl 525 still further upward to engage the stud 547 higher in its notch in plate 549, and to engage the stud 527 in the vertical rear end portion (not shown) of the cam slot 526. Accordingly, as the bail 531 moves under the shoulder 529 into the horizontal portion of the slot 528 in pawl 525, the stud 527 in the vertical portion of slot 526 positively locks the actuator to the pawl 525 and the plate 523.

In each machine cycle in which the actuator rack 511 is moved forwardly, the corresponding print bar 562 is raised by means of gear 566 to position the appropriate slug of type 561 thereon at the printing line in front of the platen 1057. As was previously described, the bail 531 causes the coupling pawl 525 and connected rack plate 523 to move forward a predetermined short distance after the associated actuator rack 511 has been arrested, and similarly causes a corresponding short forward movement of the coupling pawl 525 and rack plate 523 when the actuator rack is held immobile in its normal position during a machine cycle. Consequently, the print bar 562 will be elevated a predetermined short distance in addition to a distance proportional to the amount of movement, if any, permitted the corresponding actuator rack 511 during any machine cycle. This predetermined short distance which the type bar is elevated beyond the distance proportional to the amount of movement permitted the corresponding actuator rack is equal to the distance between the printed line and the uppermost type position on each print bar 562 when the latter is in its normal retracted position. Due to the provision of this incremental retraction of the print bars below the print line, the line is clearly visible before and after each machine cycle. In any machine cycle in which the actuator rack 511 is not permitted any forward movement, the associated print bar will be elevated to bring the uppermost type position thereon to the printing line.

At a point in the machine cycle subsequent to the termination of forward movement of all the actuator racks and the upward movement of their associated print bars, the hammers 605 are caused, in a manner fully described in the above-identified patent to Butler, to rotate in a clockwise manner about shaft 606 so as to drive the selectively aligned slugs of type 561 rearwardly into the recording medium interposed between them and the platen. It is in this manner that the desired numerals or symbols are impressed upon the recording medium.

After the printing operation takes place, the bail 531 is restored to its normal rearward position by means fully disclosed in the Butler patent.

In order to cause the information which has been indexed into the actuator racks of the machine to be made available for use externally of the machine, apparatus is provided for producing an electrical signal which is a counterpart of a mechanical rack position. This operation must be rapid and accurate. A relatively simple and efficient means for producing this output utilizing the existing indexing elements within the machine will now be described.

The read-out mechanism for producing a suitable electrical output from an electromechanical machine wherein there is exact correspondence between the actuator rack position and the output signal is illustrated in detail in on or more of the Figs. 1, 2, 4, 5 and 6 of the drawings.

Figure 4:
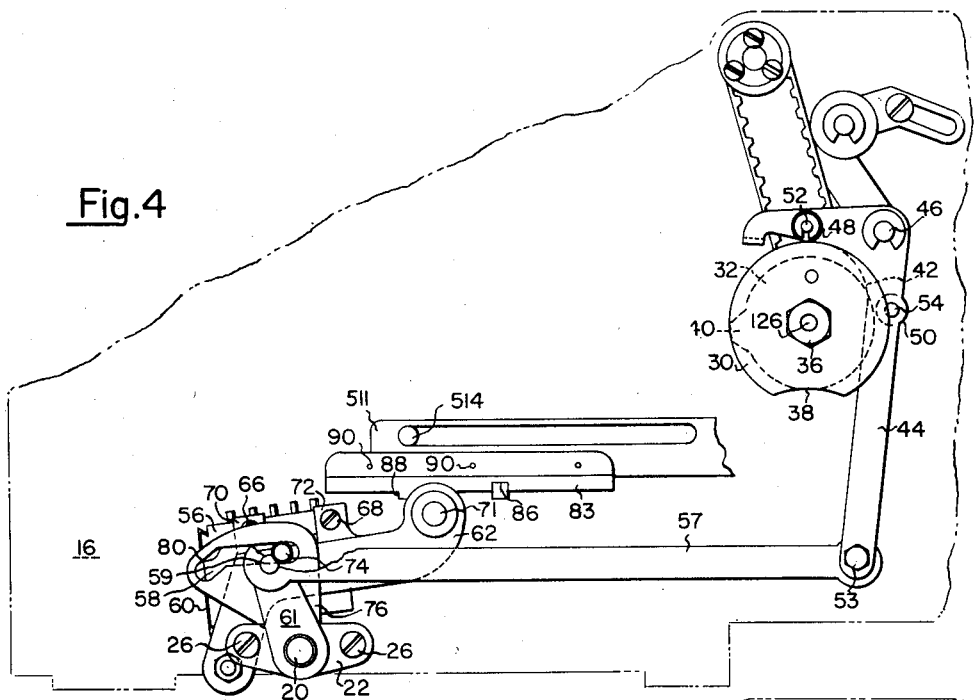
Figs. 4 and 5 are side elevational views of a switch bank read-out and camming mechanism in accordance with the invention and viewed from the side of the machine opposite to that shown in Fig. 1.
Figure 5:
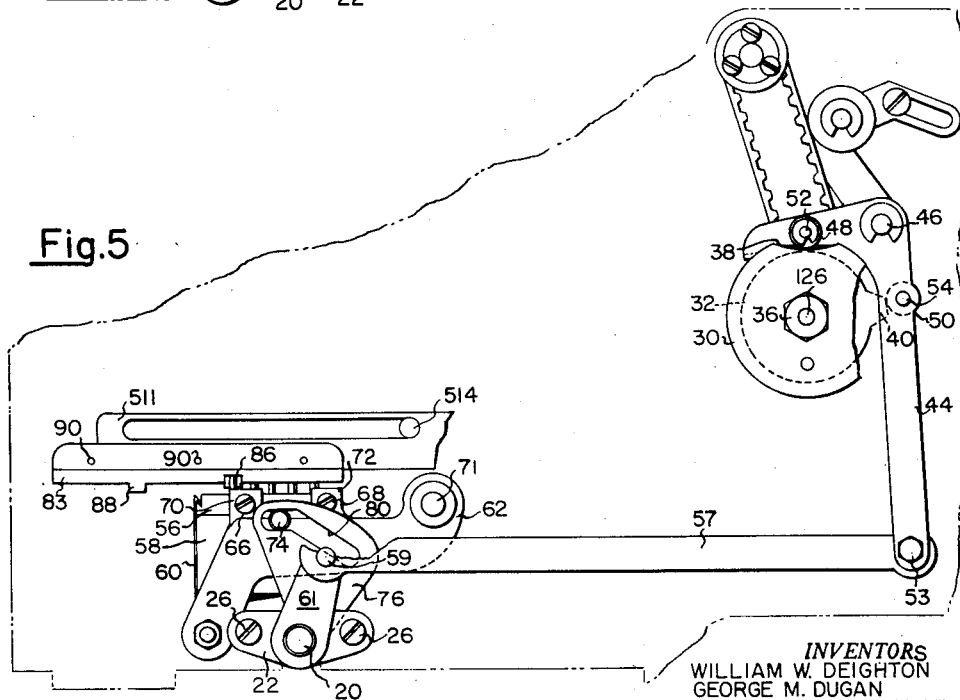

In Figs. 4 and 5 of the drawings, wherein the operating linkages which provide power take-off means from the main cam shaft 126 of the machine to the switch bank and coded slides of the read-out 10 of the present invention are illustrated, it can be seen that the complete assembly is adapted to be contained within the housing, a portion of which is shown in phantom in Fig. 1, which is normally associated with the machine. The present read-out mechanism is generally located in the extreme rearward or final register position of the machine. No additional extensions of the actuator racks are therefore necessary in order to utilize the present invention.

Figure 2:
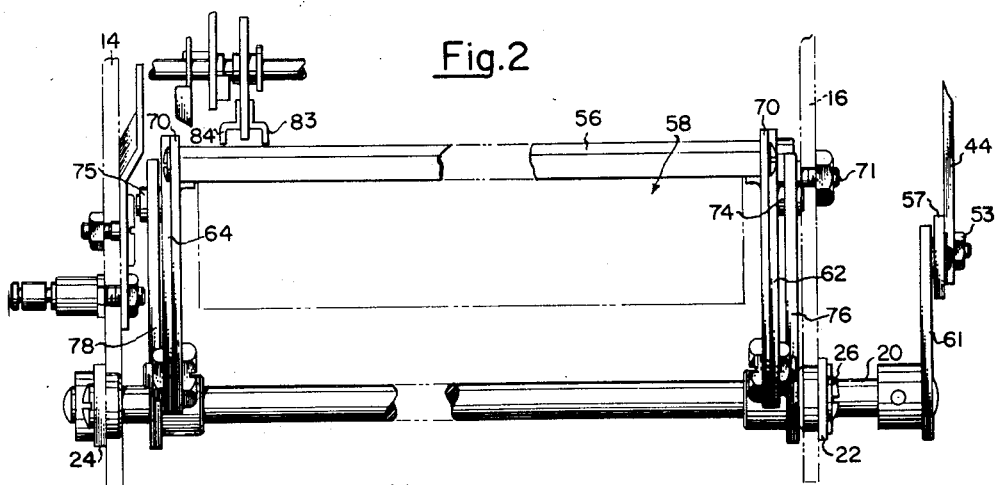
Fig. 2 is a rear elevation of the switch bank apparatus used with the device illustrated in Fig. 1.

In Figs. 2, 4 and 5 there is shown a sensing shaft 20 mounted transversely of the two side frames 14 and 16 and journaled at either end thereon. The shaft 20 is adapted to extend slightly beyond the side frame 16 and is provided with a separate bearing plate 22 and 24 at opposite ends thereof which are mounted in suitable fashion as by bolts 26—26 to the external surfaces of each one of the side frames. The slight extension of the shaft beyond the side frame provides sufficient clearance for the additional apparatus which is adapted to be secured on the main cam shaft adjacent the side frame.

Figure 3:
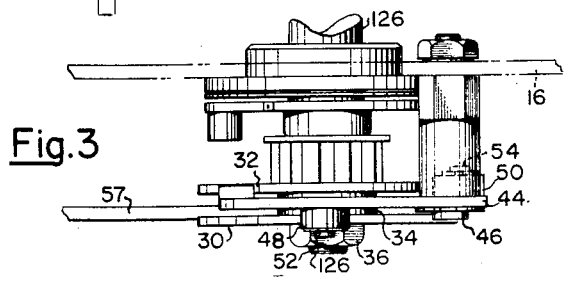
Fig. 3 is a top plan view of a portion of the main drive shaft broken away to show certain features thereof in detail.

A pair of sensing cams 30 and 32 are separatingly secured by means of a bushing 34, Fig. 3, to the main cam shaft 126, for rotation therewith, by any suitable means such as a nut 36 threadedly engaging the end of the shaft. The outermost cam 30 is provided with a cutout 38 having a substantially concave configuration while the innermost cam 32 is provided with a protuberance 40 and an oppositely disposed concavity 42 in the edge portion thereof.

A cam follower arm 44 of generally L-shaped configuration is pivotally mounted by means of the stud 46 to the side frame of the machine. An upper cam follower roller 48 and a lower roller 50 are separately rotatably mounted to the follower arm by means of the pins 52 and 54, respectively.

Cam follower roller 50 is adapted to be engaged by the protuberance 40 on cam 32 while the roller 48 is caused to follow the concave contour of the cutout 38 on cam 30. The cam follower arm 44 is thus adapted to rock about its pivotal axis upon rotation of the cam shaft 126. The longer or depending end of the follower arm has mounted thereto by means of the pivot 53 an elongated link or drive arm 57. The link is horizontally oscillatably pivoted at 59 to a vertically projecting sensing crank arm 61. The crank arm is mounted for rocking motion about the sensing shaft 20.

A bank of decimal switches 58, Figs. 2 and 6, is mounted on a base plate 56. The base plate, which comprises a relatively rigid elongated flat member, extends transversely of the machine and is provided with a series of perforations or apertures corresponding in physical position to and receiving the operating plungers of the decimal switches secured thereto. In this manner the pins are provided with guiding means therefor.

The base plate 56 to which the switches are flexibly secured by means of the straps 60 is rigidly supported between two switch sensing arms 62 and 64, Figs. 1, 2, 4, 5 and 6, which are disposed at opposite end portions thereof. The two arms provide means for elevating and lowering the decimal switch bank 56 arcuately around their pivotal axes toward and away from the area immediately adjacent the actuator racks 511. Each arm 62 and 64 has a substantially S-shaped configuration. The arms are secured to the base plate 56 by means of bolts 66 and 68 which are disposed through apertures provided in each one of the pairs of upstanding tabs 70 and 72 located intermediate the ends of the sensing arms. A separate cam follower roller 74 and 75, respectively, is rotatably mounted to each arm between each pair of tabs. The upper ends of each of the arms are pivotally mounted to the side frames by means of the bolt 71 in a conventional manner.

An individual sensing cam segment 76 and 78, Figs. 1, 4, 5 and 6, provided with an integral sloping camming slot 80 and 82, respectively, therein, is rigidly secured to opposite ends of the sensing shaft 20 parallel with and immediately adjacent each one of the two sensing arms 62 and 64. The sensing cam segments are thus obliged to rock back and forth with the rocking motion of the sensing shaft. The cam follower rollers 74 and 75 rotatably mounted to each of sensing arms are engaged in the slots of their respective sensing cam segments and are constrained therein to move in the direction of the slope in response to rocking movement of the sensing cam segment about its pivotal axis.

It can be seen from the foregoing description and from the physical disposition of the switch bank within the machine that the actuator racks 511 of the accounting machine are adapted to move over the tops of each one of the multi-unit switch assemblies in the switch bank. In order to provide means for translating the mechanical position of the rack into a desired electrical output it is necessary that each one of the racks be provided with means for the switches to sense thereagainst so that the switch contacts of each switch may be positioned to represent the rack position.

In the operative embodiment set forth in Figs. 1, 2, 4, 5 and 6 there is illustrated a novel sensing means for accomplishing this objective which comprises a pair of angular coded plates or strips 83 and 84. Each plate or strip is notched in a decimal code. A pair of coded strips are reciprocable with each one of the racks.

Each coded strip 83 may take the form shown in Figs. 2 and 6 namely, that of a rigid elongated flat member provided with two opposite right angle bends therein to form a rigid element having a pair of parallel side portions with a central connecting flat surface portion extending parallel with the side portions and perpendicular thereto. Along one edge of each strip there is provided a notch 86 and a projection 88, Figs. 4, 5 and 6, spaced from one another intermediate the ends of the strip. Each one of the add racks 511 is provided with a pair of coded strips which are secured to the rearwardly extending portion of the racks and are attached thereto in any suitable fashion as by rivets 90—90. The notch of each of the add rack strips is disposed opposite a projection or tab of its neighboring parallel strip.

In order to perform the sensing opertion, i.e., set the individual switches in the bank with the positional information indexed from the rack, it is necessary to cam the switch bank into engagement with the coded strips on the bottom edges of the racks. Referring now to Figs. 4, 5 and 6 of the drawings it can be seen that the linkage, provided by the cam follower arm 44 and the elongated drive link 57 pivotally attached to one end thereof, is adapted to be oscillated forwardly and rearwardly in response to the rotary motion of the main cam shaft 126, the cams 30 and 32 and the follower rollers 48 and 50, respectively, which rotate therearound. Since the slotted sensing cam segments 76 and 78 are fixed to the shaft 20 the rockable motion transmitted to the sensing crank arm 61 by the elongated drive arm will force the cam follower roller to raise the switch bank since the roller is captivated by the slanting camming slot therein. In this fashion the switch bank can be moved upwardly in an arcuate path around the pivot point of the arms disposed at opposite ends thereof.

Fig. 4 is a side elevational view illustrating the switch bank in the normal position in which the switches are shown out of engagement with the coded slides. It is to be noted that since the cams which provide means for transferring motion from the cam shaft to the switch bank are constantly turning, the switch bank is adapted to be continuously rocked into and out of engagement with the coded slides. Uninterrupted sensing may be provided by this means. Means is thus provided for causing the switches to sense and store the positional information relative to the rack positions.

In order to understand the operation of the switches and the manner in which temporary or indefinite storage may be provided, reference is now had to Figs. 7 through 12, inclusive, wherein a preferred form of decimal switch 12 is shown. This switch is described and claimed in the copending application of William W. Deighton entitled "Switch Mechanism," Serial No. 480,266, filed January 6, 1955. As shown, each decimal switch assembly comprises an insulating central body portion 100 provided with top and bottom covers 102 and 104. A plurality of hollow recesses or chambers 106 are disposed within the portion 100 into which the operating members of the individual switch are secured by means of a pin 108. In the embodiment illustrated herein five individual switches are disposed in separate chambers in the central portion 100. Each switch is provided with a pair of operating plungers or rods 110 and 112 protruding from one end thereof. Each of the rods engages an actuator mechanism 114 on opposite sides thereof internally of the switch. The actuator 114 is provided with a spring biased element 116 which is adapted to rock a conductive contactor element 118 into and out of engagement with two oppositely disposed contacts 120 and 122 by means of a double fulcrumed pedestal 117, Fig. 10, on which the contactor is pivotally mounted.

Due to the novel configuration of the pedestal 117, a neutral position, Fig. 8, is provided for the switches. In this position, as shown, the contactor 118 is held out of engagement with the two contacts 120 and 122, and the plungers 110 and 112 are resting in a semi-retracted position against the upper end shoulder portions of the contactor. It is obvious that in this latter position of the switch, Fig. 8, no complete electrical circuit is or can be made through either of the contacts 120 and 122.

The five switch units thus enclosed in an insulating block permit the unit to be actuated from the end portion thereof by means of the protruding plungers.

In the present application, illustrated for example in Figs. 6 and 12, the cover 102 is not utilized since multiple blocks of switch units are to be employed. The base plate 56 is substituted for the cover 102. The flexible U-shaped clamps or bands 60 securing each switch block to the plate 56 provides a slight amount of movement of the switch block in relation to the base plate. In this manner, the engagement of each one of the switch plungers with their respective projections and notches on the racks need not be an exact fit since each switch block is provided a slight flexure about the longitudinal axis of the whole bank of switches 58. By placing the switch blocks compactly together in side-by-side abutment and securing the same to one side of a supporting plate provided with holes through which the switch plungers project to the opposite side of the plate, a neatly stacked read-out unit is thus provided.

Once the decimal switch bank 58 has been cammed upwardly against the coded strips 83 and 84 of the add racks 511 and the information previously indexed into the racks has been stored in the switches by virtue of the selected displacement of certain of the operating pins on the switches, the switch bank is automatically cammed back arcuately downwardly to its normal or rest position to await the next cycle of operation. However, since the sensing arms 62 and 64 are actuated through linkages which derive their power from the main cam shaft 126 of the machine, it can be seen that the switch bank will be cammed toward and away from the add racks with each cycle of rotation of the main cam shaft. Obviously, each time new or different data is indexed into the racks this information will be introduced into the switch bank by opening and closing various and different switches from the ones initially opened or closed. Thus it is possible to utilize the cyclic movement of the main cam shaft to provide automatic cancellation means for the stored information.

Indefinite storage of information is also provided, however, if desired. The machine, although permitted to cycle continuously, need not be indexed with new data at each cycle so that whatever data is initially stored in the switch bank can be permitted to remain therein, since, until a change is ordered by the altering of the positions of the add racks, the switch pins are obliged to remain in the selected depressed or projected condition in which they were first positioned by their contact with the coded strips of the add racks.

Figure 13:
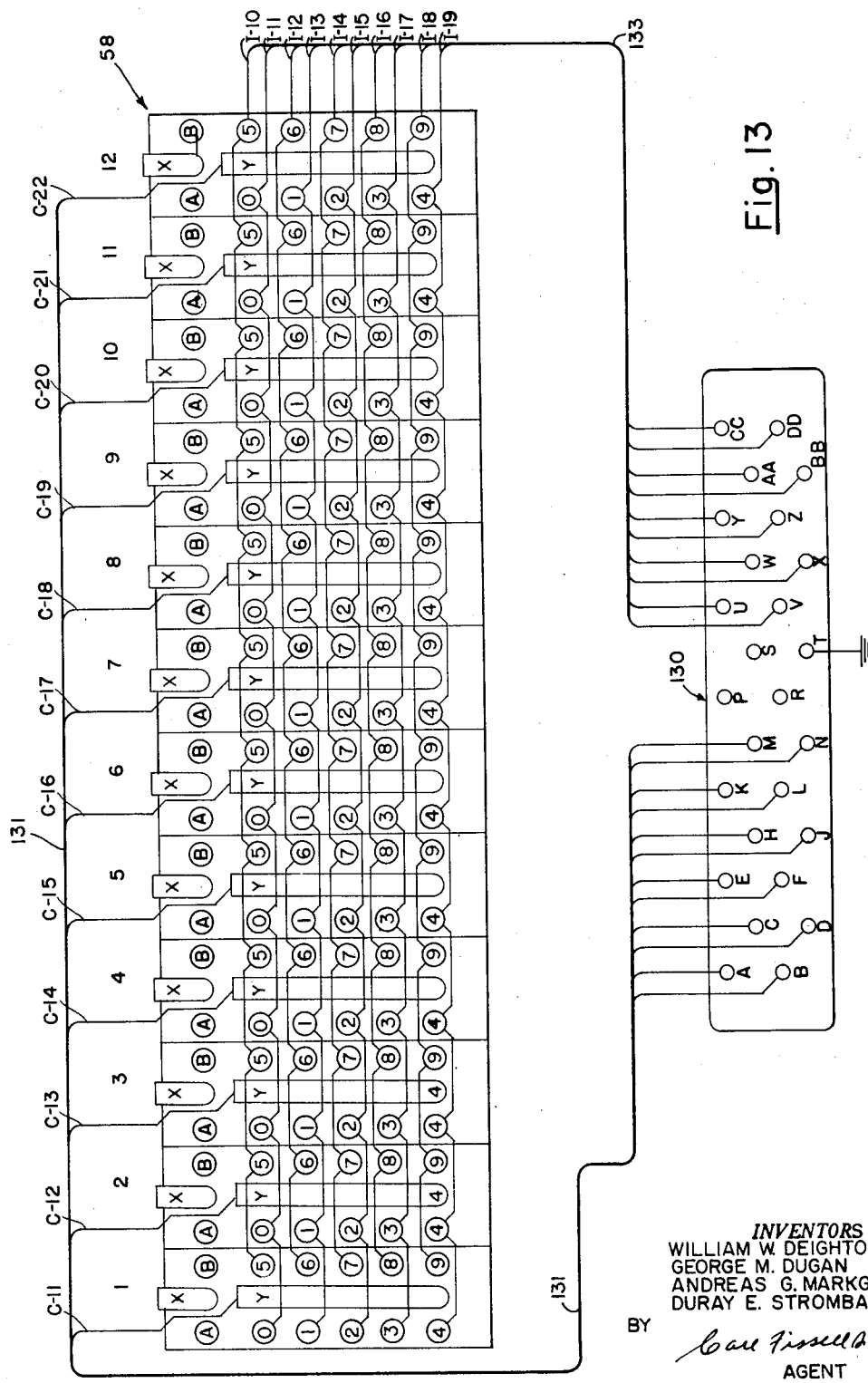
Fig. 13 is a diagrammatic view of the switch bank for use in the present invention.

A diagrammatic illustration of the switch bank or matrix 58 is shown in Fig. 13. It can be seen from a reference to this figure of the drawing that twelve separate blocks of switches, each having five switch units per block, are arranged in a matrix which, as pointed out earlier herein, is disposed beneath the coded strips 83 and 84 of twelve add racks so that the vertically projecting rows of operating pins of the switches corresponding to the numbers from "zero" through "nine" on each block are in substantial parallel alignment with the coded strips of the add racks. A common electrical connection is made to the matrix by means of the busses or leads C–11 through C–22, inclusive, to the common terminals 121 of each switch block as indicated in Fig. 13, generally by the reference character Y. Seperate individual electrical connections designated I–10 through I–19, inclusive, are made to each of the individual switch contacts 120 and 122 in serial fashion. Thus all the number "one" switch contacts are serially connected together and all the number "two" contacts are likewise connected together, and so on. The busses or leads from the common terminals are brought out through a cable 131 to a terminal block designated 130 which is or may be disposed on the rear portion of the machine for purposes of convenience and to facilitate the electrical interconnection therewith of other associated equipment. The individual busses, or leads, are likewise brought out from the switch bank through a cable 133 and are fed into the receptable 130 in the same fashion as the common terminal lead.

As evident from Fig. 13, an additional advantage of the invention resides in the utilization of the earlier-described novel decimal switch. Since each switch unit is provided with two electrical and mechanical operating positions as well as a neutral position, a single switch unit can be employed to represent two switch positions. By stacking five switch units in the earlier-described block assembly, it then becomes possible to represent ten switch positions with five switch units. The obvious advantages inherent in this type of assembly will become apparent with a reference to Fig. 14.

When it is desired to utilize the data stored in the switches of the switch bank or matrix, each one of the individual switch contacts thereof must be interrogated so that an indication can be obtained of the particular switch and which of its contacts are closed or open, as the case may be, and the location of that particular switch in the matrix. It is then possible to simply and efficiently transfer this information to another and remotely located machine for utilization therein as desired.

One embodiment of a device for interrogating the switch matrix and reading out of the switches information relative to the position of the add racks is illustrated schematically in Fig. 14. It should be noted at this point that although an exemplary system is disclosed herein, other embodiments may be employed with equal facility without in any way departing from the scope or spirit of the invention.

A pulse generator is indicated in Fig. 14 by the numeral 134 and its output busses or lanes are individually designated by the numerals from zero through nine, respectively. Similarly a clapper-solenoid operated print wheel assembly is broadly indicated by the reference numeral 136 and its solenoids are individually designated by the letters A through L. The isometric view of Fig. 15 illustrates in more or less detail the arrangement of parts of the print wheel and solenoid assembly. Electrically interposed between the pulse generator and the print wheel assembly 136 is an electrical circuit illustrated schematically and contained within the dotted lines indicated at 138. The circuit includes a plurality of individual switches arranged in rows and columns and is representative of the decimal switch bank 58 earlier described. Each horizontal row of switches is identified by the numeral corresponding to the particular brush located on the pulse generator to which the row is electrically connected. Similarly, the vertical columns of switches within the box 138 will be respectively identified by a numeral S–1 through S–12, inclusive, corresponding to the particular solenoid to which the column is electrically connected.

As may be seen from a reference to Fig. 14 each one of the brushes zero through nine of the pulse generator is connected to a separate horizontal row of switches. The pulse generator comprises a rotatable member 140 which may take the form of a drum which is adapted for continuous rotation by means of a shaft 142 and which may be connected to a driving motor 143.

Each brush is in electrical contact with a conductive area designated CA–0 through CA–9, inclusive, corresponding in physical length to the desired pulse length. The pulses are illustrated in Fig. 13 as an enlargement of the conductive lanes zero through nine between the brushes and the switches of the matrix. The conductive areas are disposed arcuately on the peripheral surface of the drum starting from the reference line. Upon the application of an electrical potential to the drum in a conventional and well-known manner and upon rotation thereof, the brushes will be caused to contact the conductive areas as the drum revolves. An electrical output or pulse is thus produced having a length corresponding to the physical length of the conductive area over which each brush passes. These pulses are then forwarded over the interconnecting busses to the switch matrix in order to provide means for interrogating each switch in a manner to be described presently.

The shaft 142 is provided with a number of indicating and/or printing wheels 144 of the type shown in the enlarged fragmentary view of Fig. 15. Each one of the print wheels is coupled to the shaft 142 by means of a frictional coupling 146 of any suitable type which will normally rotate the wheels jointly with the shaft but will permit each of the wheels to be separately held from rotation independently of the other wheels on the shaft. A solenoid 151 is associated with each print wheel 144. The clapper 152 of each one of the solenoids is biased by a spring 154, Fig. 15, in a conventional manner so that upon de-energization thereof, the clapper is snapped into detenting engagement with the supporting base of a type face 156 secured to the periphery of each print wheel. Since the shaft 142 is adapted to be rotated at a constant velocity from the common driving source 143, it can be seen that by virtue of the coupling 146 all of the print wheels except those detented by the solenoid clappers will continue rotating.

The pulses, designated P-0 through P-9, inclusive, generated by the pulse generator 134 are fed into the switch matrix over the leads before-mentioned. When a closed switch contact is met by an electrical pulse the potential is thereby directed from the horizontal row over which it had been moving to a vertical column and thence to one of the solenoids A through L, inclusive. The pulse or pulses thus directed cause the clappers of selected solenoids to be pulled in and held against their respective cores for a period of time corresponding to the length of the selected pulse. Thus the print wheels associated with the solenoids are permitted to revolve with the rotating shaft 142 until such time as the pulse is stopped. At this instant the spring of each clapper will cause it to be pulled into engagement with a type face and thus stop the wheel from rotating. In this manner a visible indication is automatically produced of the information stored in the switch corresponding to a particular rack for utilization at some remote location. The circuit arrangement of Fig. 14 is such that all of the switches of each horizontal row are in parallel with each other and in series with their associated brush in the pulse generator. Similarly, the opposite sides of the switches in each column are in parallel with each other and in series with the winding of their respective solenoids.

Accordingly, electrical energizing circuits are thus adapted to be formed from each one of the brushes of the pulse generator through the switches of the switch matrix 138 to the solenoids controlling their respective print wheels. When it is desired to interrogate the decimal switch bank and to read out the information which has previously been stored therein in the form of positions of the various switches, pulses, differentiated in time with respect to each other, i.e., a longer pulse for a larger number starting with zero having the shortest pulse, are generated by the pulse generator and are sent through the interconnecting busses and through the matrix to the solenoids. Those switches previously set by engagement of their pins with the coded strips of each add rack thus provide, through their closed contacts and the circuitry above described, a pathway for the pulses so that the data indexed into the add racks of one machine can be caused to operate a remote device such as a secondary or slave machine by virtue of the pulses selectively derived therefrom.

The advantages of utilizing the novel decimal switch unit herein described are graphically set forth by a visual comparison of Fig. 13 with Fig. 14 of the drawings. It is obvious from a reference to these figures that the number of individual switch units actually utilized in the switch bank 58, Fig. 13, is approximately half the number of switch units illustrated schematically in the switch matrix 138 of Fig. 14. The compact arrangement of the individual switch units in separate blocks of five switch units to a block permits a considerable saving in space since a number of switch blocks may be stacked together to form a switch bank as described herein. Further desirable features of the invention include the accessibility of the individual switches for service and repair and the saving in weight due to the utilization of lightweight plastic materials for the insulating body portion of the switch blocks.

What is claimed is:

1. In an accounting machine, means for converting the mechanical position of a part of the machine into an electrical signal comprising, a rack bar reciprocably movable in the direction of its longitudinal dimension and having a tooth-like element projecting from one side thereof, means responsive to the actuation of a value indexing member for moving the rack bar a predetermined distance to a position indicative of the assigned value of the member, a switch body including a multiposition switch having multiple stable switch positions, said switch having a depressible plunger which when depressed acts to set the switch to a selected one of its stable positions directly from a previously set stable position, and means for bodily moving the switch body toward and away from the tooth-like element of the rack bar and at substantially the end of its movement toward the rack bar to cause the plunger to sense the presence or absence of the tooth element in its path of movement and to further cause the plunger to be depressed upon encountering the tooth element.

2. In an accounting machine, means for converting the mechanical position of an element of the machine into an electrical signal in exact correspondence therewith comprising, a rack bar reciprocably movable in the direction of its longest dimension and having a pair of coded strips disposed parallelly one on opposite sides thereof and secured to the rearwardly extending portion of said rack bar, means responsive to the actuation of a value indexing member for moving the rack bar a predetermined distance to a position indicative of the assigned value of the member, a multiplicity of separate switch units arranged in side-by-side abutting relation and forming a stack, said stack extending parallel to the longitudinal dimension of the rack bar with which it is associated, the switches of each switch unit being provided with multiple electrical contacts and a pair of depressible projecting plungers which when depressed act to close said contacts, means for elevating and lowering said switch stack to bring a corresponding one of the projecting plungers into engagement with a corresponding one of the coded strips to cause the engaged plunger to be depressed and to sense the presence or absence of coded information therein.

3. In an accounting machine, means for converting data representative of the positions of different elements of the machine into a corresponding electrical signal comprising, actuator members extending longitudinally of said machine and having a motion determined by an indexing mechanism operatively coupled thereto, said motion being in the direction of the longitudinal dimension of said actuator members so as to cause said members to reciprocate forwardly and rearwardly of the machine and assume a stable position depending upon the indexed data, a bank of switches extending transversely of said machine, means capable of moving the bank up and down to thereby cause the switches thereof to be brought into engagement with said actuator members and sense thereagainst at each cycle of operation of the machine, and a power shaft for producing rotary motion at each cycle of said machine, said shaft being provided with camming means operatively coupled to said means for moving said bank of switches in said up and down direction.

4. In a calculating machine having input means for indexing information therein and being provided with data recording means to produce a visible record of the indexed information, the combination which comprises, a power shaft, a pair of cams disposed on said shaft and rotatable therewith during each cycle of operation of said shaft, a plurality of actuator members extending longitudinally of the machine, each actuator being provided with a separate pair of coded members, each coded member having at least one notch and one projection along the unsecured edge portion thereof, said actuator members being operatively coupled to the input means and responsive to information indexed therein to move to positions representative of the value of the information so indexed at each cycle of operation of the power shaft, a bank of switches extending transversely of the machine, means supporting the switch bank for bodily movement toward and away from said actuator members, means operatively coupling said cams with said switch bank supporting means and capable at each cycle of rotation of the power shaft to move the switch bank toward and away from said actuator members, the switches of said bank each having a pair of plungers for sensing the notch and projection on a separate one of said actuator members and engageable with said notch and projection as the bank of switches approaches the end of its movement toward the actuator members to thereafter assume positions characteristic of the indexed information.

5. A read out, storage and transfer device for an accounting machine comprising, a plurality of character indexing means, a plurality of coded strips adapted to be operated to distinctive combination of positions by manipulation of any of said character indexing means, a plurality of storage members comprising a switch bank associated with said coded strips and adapted to be moved bodily toward and away from said coded strips, means operable at each cycle of operation of said machine for raising and lowering said switch bank, an electrical switch matrix having input and output indexing means associated with said switch bank, a pulse generator connected to said input means for generating time differentiated pulses in exact correspondence to the characters resulting from manipulations of said indexing means and adapted to interrogate said switch bank by forwarding pulses through said switch matrix, a plurality of number indicating wheels connected to said output means and being visibly displayed in association with said switch matric, said number wheels being mounted to a constantly rotating shaft and adapted to rotate in synchronism with said pulse generator, means on said shaft permitting selective rotation of any wheel in response to character selection by said indexing means, and means to reset said character indexing means to a non-character indexing position.

6. In a cyclically operable digit indicating apparatus, the combination of a switch matrix including switches disposed in rows and columns, input and output means connected to said matrix, each one of said switches having multiple digit representing contacts electrically connected thereto, means to represent digits by potentials applied to the digit representing contacts of the switches in said switch matrix, an indicating device provided with digit indicating means thereon and settable in response to said potentials to position said digit indicating means to a reading position, a pulse generator electrically connected to said input means to supply potentials in the form of time differentiated pulses to said switch matrix, means operable to set the contacts of said switch matrix permitting said contacts to represent data selectively introduced therein, means connecting said indicating device to the output means of said matrix so that said pulse potentials supplied to the contacts of said switches can be caused to actuate said indicating device to thereby selectively position it to be read, electro-magnetic means coupled to said matrix and electrically responsive to said time differentiated pulses from said pulse generator to set selected ones of said indicating devices in response to the data indexed.

7. A read-out, storage and transfer mechanism for an accounting machine comprising, a plurality of cyclically reciprocable character indexing racks, pairs of coded strips secured one to each side of each of said racks and adapted to be moved to different positions by manipulation of said racks, a storage switch bank comprising a plurality of individual switch members operatively associated with the coded strips and adapted to be moved into and out of engagement with said strips, means operable at each machine cycle to move the switch bank toward and away from the racks, an electrical switch matrix provided with input and output means operatively associated with said switch bank, a pulse generator connected to said input means for generating time differentiated pulses in exact correspondence to the resulting characters indexed into the racks, and adapted to scan said switch bank by applying said pulses to successive rows of said switch matrix, a plurality of character wheels operatively associated with said output means, said wheels being mounted upon a constantly rotating shaft and normally rotating in synchronism with said pulse generator, and means operatively associated with said character wheels providing independent motion relative to the shaft in response to character selection by said indexing means.

8. A read-out, storage and transfer mechanism for an accounting machine comprising, a plurality of cyclically operable character indexing racks, an individual coded strip secured to each side of each one of said racks and adapted to be moved to different positions by manipulation of said racks, a storage switch bank comprising a plurality of individual switch members operatively associated with the coded strips and adapted to be moved into and out of engagement with said strips at each cycle of operation of said racks, means operable at each machine cycle of operation to raise and lower said switch bank, an electrical switch matrix provided with input and output means associated with said switch bank, a pulse generator connected to said input means for generating time differentiated pulses in exact correspondence to the character resulting from manipulation of said indexing racks and adapted to scan said switch bank by applying pulses to said switch matrix, a plurality of character indicating wheels operatively associated with said output means and visibly displayed in connection with said switch matrix, said wheels being mounted upon a constantly rotating shaft and adapted to be selectively rotated in synchronism with said pulse generator, an electromagnet having a clapper, said clapper releasably engaging one of said wheels permitting selective rotation of said wheel in response to character selection by said indexing means, and means to reset said character indexing means to a non-character indexing position.

9. A read-out, storage and transfer mechanism for an accounting machine comprising, a plurality of cyclically operable character indexing racks, an individual coded strip secured to opposite sides of each one of said racks and adapted to be moved to different positions by manipulation of said racks, a storage switch bank pivotally mounted to said machine, said switch bank comprising a plurality of individual switch members, each switch member having a pair of plungers, each plunger being adapted to be slidably moved into and out of engagement with a separate one of said strips at each cycle of operation of said racks, a reciprocable linkage connected to said switch bank and operable at each cycle of said accounting machine to raise and lower said switch bank to sense against the coded strips of said racks, an electrical switch matrix provided with input and output means associated with said switch bank, a pulse generator connected to said input means for generating time differentiated pulses in exact correspondence to the character resulting from manipulation of said racks and adapted to scan said switch bank by applying pulses to said switch matrix, a plurality of number indicating wheels operatively associated with said output means and visibly displayed in connection with said switch matrix, said wheels being mounted to a constantly rotating shaft and adapted to rotate in synchronism with said pulse generator, an electromagnet having a clapper, said clapper being operatively associated with said shaft permitting selective rotation of any wheel in response to character selection by said indexing means, and means to reset said character indexing means to a non-character indexing position.

10. In an accounting machine, means for converting the mechanical position of a part of the machine into an electrical signal comprising, an elongated member reciprocably movable in the direction of its longitudinal dimension and having a tooth-like element projecting from one side thereof, means responsive to the actuation of any one of a plurality of value indexing members for moving the rack bar a predetermined distance to a position indicative of the assigned value of the indexed member, a switch body having a switch therein, said switch having a plurality of stable switch positions, a depressible plunger in said switch body which when depressed acts to set the switch to a selected one of its stable positions directly from a previously set stable position, and means for bodily moving the switch body toward and away from the tooth-like element of the rack bar and at substantially the end of its movement toward the rack bar to cause the plunger to sense the presence or absence of the tooth element in its path of movement and to further cause the plunger to be depressed upon encountering the tooth element, and means operable to apply a voltage to the switch and functioning to pass a current pulse through the switch if the same is found to be closed.

11. In an accounting machine, means for converting the mechanical position of an element of the machine into an electrical signal in exact correspondence therewith comprising, an elongated actuator reciprocably movable in the direction of its longest dimension and having a pair of coded strips disposed in parallel relationship to one another and to the longitudinal dimension of the actuator and shaped to provide a complemental notch and projection serving as a code, means responsive to the actuation of one of a number of value indexing members for moving the actuator a predetermined distance to a position indicative of the assigned value of the indexed member, a plurality of separate switch units arranged in side-by-side relation to form compact rows of units extending parallel to the longitudinal dimension of the actuator, each switch unit being provided with a movable switch member and a pair of depressible plungers for controlling the movement of the switch member from closed to open positions, means for causing relative movement between said switch assembly and said actuator to bring the complemental projection and notch of the coded strips into operative relation with the pair of plungers of a selected one of the switch units to depress one of the plungers of the selected switch unit and to raise the other plunger and move the switch member of the selected unit to one of its positions.

12. In an accounting machine, means for converting data representative of the positions of different elements of the machine into a corresponding electrical signal comprising, elongated actuator members extending in the forward and rearward direction of said machine and each having a motion independent of the others determined by an indexing mechanism operatively coupled thereto, the motion of each actuator being in the direction of the longitudinal dimension thereof so as to cause the member to reciprocate forwardly and rearwardly of the machine and assume any one of a plurality of stable positions depending upon the indexed data, a bank of switches extending transversely of said machine, means capable of moving the bank of switches up and down to thereby cause said switches to be brought into engagement with said actuator members and sense thereagainst, a shaft for producing rotary motion at each cycle of operation of said machine, and means operatively coupling said shaft to said switch bank moving means for moving the bank of switches in said up and down direction at each cycle of operation of the machine.

13. The invention described in claim 12 characterized in that means is provided for applying a voltage to each switch of the bank and functioning to pass a current pulse through any closed switch of the bank.

14. In a calculating machine having input means for indexing information therein and being provided with data recording means to produce a visible record of the indexed information, the combination which comprises, a shaft, a plurality of cams disposed on said shaft and rotatable therewith, a plurality of actuators extending generally parallel to one another, each actuator carrying a pair of coded members, each coded member having at least one notch and one projection along an exposed edge portion thereof, said actuators being operatively coupled to the input means and responsive to information indexed therein to move to positions representative of the value of the information so indexed at each cycle of operation of the machine, a bank of switches extending transversely to the general parallel direction of the actuators, each switch of said bank being associated with one of the actuators and being provided with a pair of plungers for sensing the notch and projection on the pair of coded members carried by the actuator, means supporting the switch bank for bodily movement relative to said actuators, means operatively coupling said cams with said switch bank supporting means and effective to move the switch bank towards said actuators whereby a pair of plungers on certain ones of said switches are engageable with the notches and projections of the coded members as the bank of switches approaches the end of its movement toward the actuators so as to move the switches controlled thereby to positions characteristic of the indexed information.

15. In an accounting machine, a character indexing means, a plurality of coded strips movable to distinctive combinations of positions by manipulation of said character indexing means, a plurality of storage members comprising a bank of electrical switches disposed adjacent to said coded strips and mounted for movement toward and away from the coded strips, means operable conjointly with the machine for moving said bank of switches toward and away from said coded strips, said switch bank being operable when moved toward the coded strips to sense against the same and close switches in the bank corresponding to the characters indexed into the machine, electrical leads forming the rows and columns of a matrix, the switches of said bank being located at the intersections of the rows and columns of the matrix and each switch serving to open and close the connection between its respective row and column, a pulse generator connected to the electrical leads forming the rows of the matrix and generating time differentiated pulse each corresponding to a different one of the characters resulting from the manipulation of said indexing means and operable to distribute each such pulse to a different row of the matrix, and a plurality of utilization devices connected to the leads of the matrix forming the columns thereof and each being responsive to the pulse transmitted by the closure of a selected switch in the matrix of the column lead to which the device is connected.

16. In an accounting machine, character indexing means, a plurality of coded strips movable to distinctive positions by manipulation of said character indexing means, a bank of electrical switches disposed adjacent to said coded strips and mounted for movement toward and away from the coded strips, means operable conjointly with the machine for moving said bank of switches toward and away from said coded strips, said coded strips being operable when the bank is moved theretoward to close those switches in the bank corresponding to the characters indexed into the machine, electrical leads forming the rows and columns of a matrix, the switches of said bank being located at the intersections of the rows and columns of the matrix and each switch serving to open and close the connection between its respective row and column, means connected to the electrical leads forming the rows of the matrix and providing time differentiated pulses each corresponding to a different one of the characters indexable into the machine and distributing each such pulse to a different row of the matrix, and a plurality of utilization devices connected to the leads of the matrix forming the columns thereof and each being responsive to the pulse transmitted by the closure of a selected switch in the matrix of the column lead to which the device is connected.

17. In an accounting apparatus, the combination of a switch matrix including a plurality of rows and columns of electrically conductive elements and further including a separate switch at each point of intersection of a row and a column and serving when closed to provide a connection between its respective row and column of the matrix, indexing means operable to close switches of said matrix to represent data selectively indexed therein, a pulse generator electrically connected to the matrix to supply a distinctive electrical potential to each row element of the matrix, a plurality of utilization devices, and means connecting a respective utilization device to a different one only of the column elements of the matrix so that each utilization device receives a distinctive electrical signal when a switch of its column element is indexed to closed position.

18. In an accounting machine, a plurality of reciprocable character indexing members, a coded strip associated with each of said members and adapted to be moved to different positions by manipulation of said members, a switch matrix comprising a plurality of individual switches electrically connected in rows and columns with each switch individually located at an intersection of a row and column and operable to open or close the electrical connection therebetween, means operable at each machine cycle to move the switch matrix toward and away from the coded strips and when moved theretoward to sense the coded strips and close those switches in the matrix corresponding to the characters entered into the machine by the indexing members, the rows and columns of the matrix serving as the input means and the output means respectively of the matrix, a pulse generator connected to the row input means of the switch matrix for generating time differentiated pulses corresponding to the different characters resulting from movements of said indexing members and adapted to scan the switch matrix by applying such time differentiated pulses to successive rows thereof, and a plurality of utilization devices coupled to said pulse generator for operation in synchronism therewith, and means coupled to the column output means of the switch matrix for modifying the operation of the utilization devices and becoming effective to do so in accordance with the closure of the switches in the switch matrix.

19. In an accounting machine, a plurality of movable character indexing actuators, an individual coded strip carried by each one of said actuators and adapted to be moved thereby to different character indexing positions by manipulation of its respective actuator, a storage switch bank comprising a plurality of individual switches, means for moving the switch bank and the actuators relatively toward and away from one another and when moved toward one another to cause the switches to engage the coded strips and close those switches of the bank corresponding to the characters indexed by the actuators, the switches of said switch bank being electrically connected in rows and columns to form an electrical switch matrix wherein the rows constitute the input means of the matrix and the columns constitute the output means of the matrix, a cyclically movable pulse generator operatively coupled to said input means of the switch matrix for applying thereto time differentiated pulses corresponding to the characters determined by manipulation of said actuators, a plurality of cyclically movable utilization devices, means operatively coupling said utilization devices to said pulse generator for synchronized operation therewith, an electromagnet associated with each of said utilization devices and having an armature in the form of a clapper, the clapper of each electromagnet responding to the energization and de-energization thereof and being operatively engageable with its respective utilization device for modifying the operation thereof, and means electrically connecting each electromagnet with the output means of the switch matrix and rendering selective ones of the electromagnets operable upon closures of one or more switches in the matrix as determined by the characters indexed by the actuators.

20. A transducer for an accounting machine adapted to translate the physical positions of a plurality of differentially positionable actuators into electrical signals wherein the numerical value of each decimal order of an information number is identified by a position selected from among ten serially spaced positions of each one of said actuators; a plurality of rows of switch mechanisms, one for each actuator, each such row being arranged parallel to the movement of its associated actuator and being constituted by five switch mechanisms; each switch mechanism including a pair of contacts and a movable switch member which when moved to a first position closes one of said pair of contacts while opening the other and when moved to a second position closes the other contact while opening the former contact and when moved to a third position closes neither contact; each switch mechanism further including a pair of plungers reciprocably movable in opposite directions and operatively associated with its switch member for moving the same to said first, second or third positions; each actuator having a coded projection and notch bearing such a relation to the row of switch mechanisms associated therewith that when the actuator assumes any one of its ten positions its notch and projection will be in operative relation to the pair of plungers of the switch mechanisms significantly characteristic of the actuator's position; said operative relation being such that when relative motion of the actuator and its associated row of switch mechanisms toward one another occurs the pair of plungers acted upon by the actuator's projection and notch will be oppositely reciprocated and move their associated switch member to one of its contact closing positions.

21. A transducer for an accounting machine adapted to translate the physical positions of a plurality of differentially positionable actuators into electrical signals wherein the numerical value of each decimal order of an information number is identified by a position selected from among ten serially spaced positions of each one of said actuators; a plurality of rows of switch mechanisms one for each actuator, each such row being arranged parallel to the movement of the associated actuator and being constituted by five switch mechanisms; each switch mechanism including a pair of contacts and a movable switch member which when moved to a first position closes one contact of said pair while opening the other contact, and when moved to a second position closes the said other contact and opens the said one contact; each mechanism further including a pair of plungers reciprocably movable in opposite directions and operatively associated with its switch member for moving the same to said first and second positions; each actuator having a coded projection and notch bearing such relation to the row of switch mechanisms associated therewith that when the actuator assumes any one of its ten positions, its notch and projection will be in an operative relation to the pair of plungers of the switch mechanism significantly characteristic of the actuator's position; said operative relation being such that when relative motion of an actuator into associated rows of switch mechanisms toward one another occurs, the pair of plungers acted upon by the actuator's projection and notch will be oppositely reciprocated and move their associated switch member to one of its contact closing positions.

22. In an accounting machine, character indexing means, a plurality of members movable to distinct positions by manipulation of said character indexing means, a bank of electrical switches disposed adjacent to said members and mounted for movement toward and away from the members, means operable during cycles of operation of the machine for moving said bank of switches toward and away from said members, said members being operable when the bank is moved theretoward to close those switches in the bank corresponding to the characters indexed into the machine, electrical leads forming the rows and columns of a matrix, the switches of said bank being located at the intersection of the rows and columns of the matrix and each switch serving to open and close the connection between its respective row and column, means connected to the electrical leads forming the rows of the matrix and providing discrete electrical signals each corresponding to a different one of the characters indexable into the machine for distributing each such signal to a different row of the matrix, and a plurality of utilization devices connected to respective ones of the leads of the matrix forming the columns thereof and each utilization device being responsive to the signal transmitted by the closure of a selected switch in the matrix of the column lead to which the device is connected.

23. In accounting apparatus, character indexing means, a plurality of members movable by manipulation of said character indexing means to distinct positions each indicative of a different character, a plurality of electrical switches, means operatively coupling the members to the switches for closing those switches corresponding to the characters indexed into the machine, electrical leads forming the rows and columns of a matrix, said switches being located at the intersection of the rows and columns of the matrix and each switch serving to open and close the connection between its respective row and column, means connected to the electrical leads forming the rows of the matrix and providing different electrical signals each corresponding to a different one of the characters indexable into the apparatus and distributing each such signal to a different row of the matrix, and utilization means connected to each of the leads of the matrix forming the columns thereof and being responsive to the signal transmitted by the closure of selected switches in the matrix of the column leads to which the utilization means is connected.

24. In accounting apparatus, character indexing means, a plurality of members movable by manipulation of said character indexing means to distinct positions each indicative of a different indexable character, a plurality of electrical switches, means operatively coupling the members to the switches for closing these switches corresponding to the characters indexed into the machine, electrical leads forming the rows and columns of a matrix, said switches being located at the intersection of the rows and columns of the matrix and each switch serving to open and close the connection between its respective row and column, means connected to the electrical leads forming the rows of the matrix and providing different electrical signals each corresponding to a different one of the characters indexable into the apparatus and distributing each such signal to a different row of the matrix, and a plurality of utilization devices connected to the leads of the matrix forming the columns thereof, said utilization devices each having a member movable to distinct positons and being responsive to the signal transferred from a row lead by the closure of a selected switch in the matrix to move to a position representative of the signal.

25. In accounting apparatus, character indexing means, a plurality of members movable by manipulation of said character indexing means to distinct positions each indicative of a different indexable character, a plurality of electrical switches, means operatively coupling the members to the switches for closing those switches corresponding to the characters indexed into the machine, electrical leads forming the rows and columns of a matrix, said switches being located at the intersection of the rows and columns of the matrix and each switch serving to open and close the connection between its respective row and column, and means connected to the electrical leads forming the rows of the matrix and providing different electrical signals each corresponding to a different one of the characters indexable into the apparatus and distributing each such signal to a different row of the matrix, the leads of the matrix forming the columns thereof serving to pass those signals transferred from the row leads by the closure of selected switches in the matrix.

References Cited in the file of this patent

UNITED STATES PATENTS

| 835,840   | Strassweg      | Nov. 13, 1906 |
| 1,166,517 | Goldberg       | Jan. 4, 1916  |
| 2,092,412 | Degen          | Sept. 7, 1937 |
| 2,095,730 | Bellamy        | Oct. 12, 1937 |
| 2,241,548 | Frischknecht   | May 13, 1941  |
| 2,573,581 | Lake et al.    | Oct. 30, 1951 |
| 2,606,244 | Johnson et al. | Aug. 5, 1952  |
| 2,643,172 | Reiss          | June 23, 1953 |
| 2,733,008 | D'Andrea et al.| Jan. 31, 1956 |
| 2,737,648 | Lohs et al.    | Mar. 6, 1956  |
| 2,765,116 | Sobisch        | Oct. 2, 1956  |
| 2,769,968 | Shultheis      | Nov. 6, 1956  |

FOREIGN PATENTS

| 1,029,462 | France | Mar. 4, 1956 |